F. MOMBURG.
PLANT PROTECTING SHED.
APPLICATION FILED JAN. 8, 1910.
963,920.
Patented July 12, 1910.
2 SHEETS—SHEET 1.
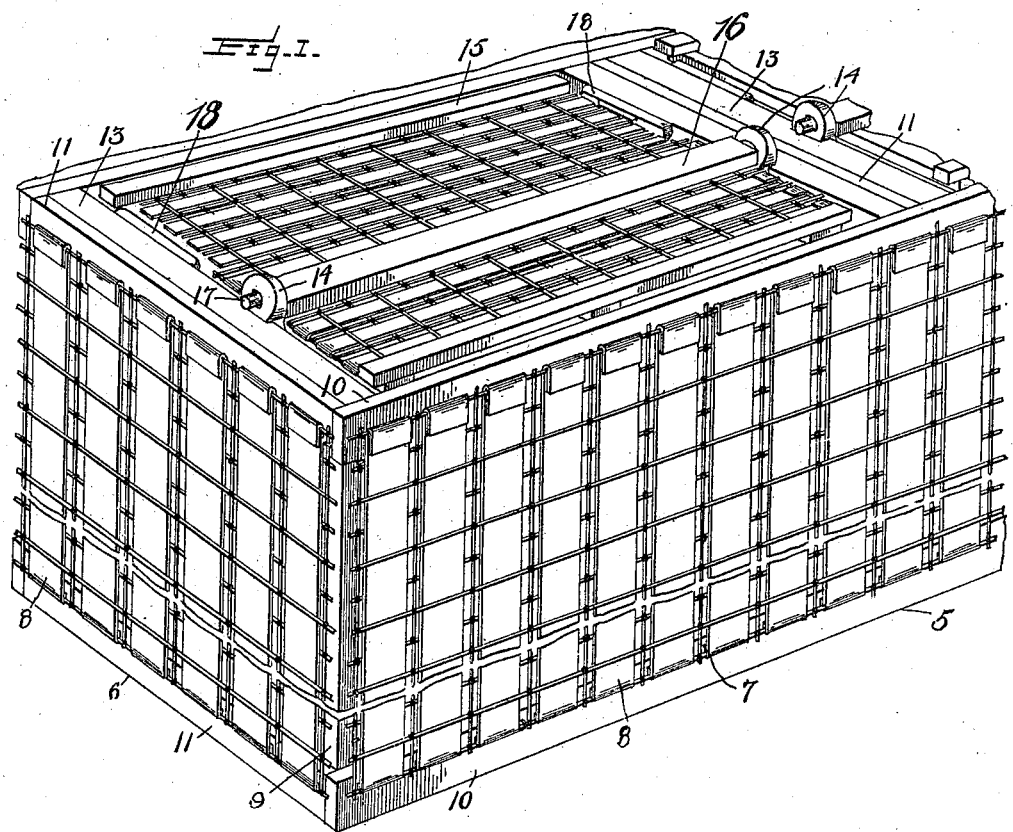
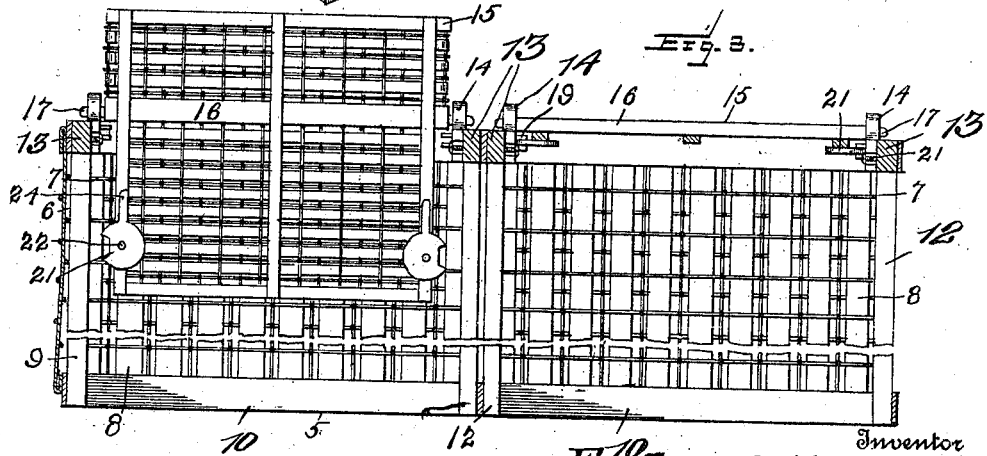
Witnesses
Ed. C. Ardener
E. M. Ricketts
Inventor
Frederick Momburg.
By Watson E. Coleman
Attorney F. MOMBURG.
PLANT PROTECTING SHED.
APPLICATION FILED JAN. 8, 1910.
963,920.
Patented July 12, 1910.
2 SHEETS—SHEET 2.
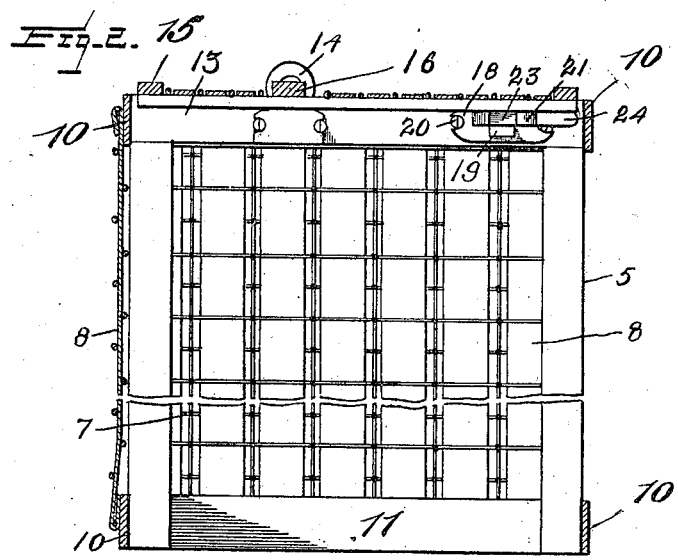
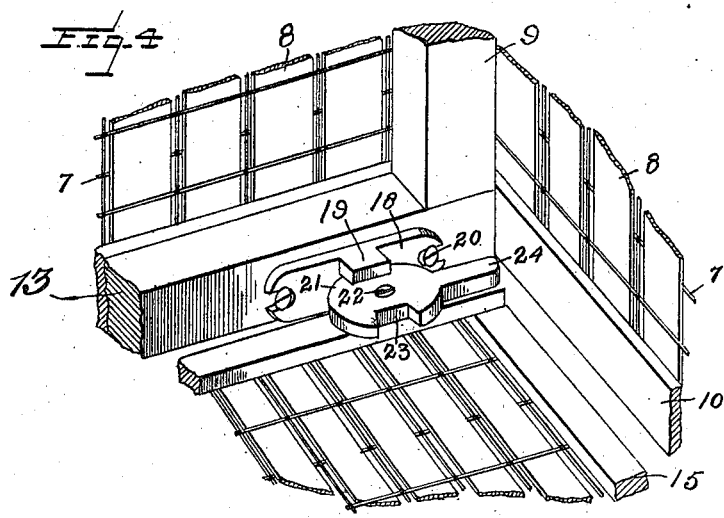
Witnesses
Ed. C. Ardener
E. M. Ricketts
Inventor
Frederick Momburg.
By Watson E. Coleman
Attorney

UNITED STATES PATENT OFFICE.

FREDERICK MOMBURG, OF YBOR CITY, FLORIDA.

PLANT-PROTECTING SHED.

963,920.  Specification of Letters Patent.  Patented July 12, 1910.

Application filed January 8, 1910. Serial No. 537,014.

*To all whom it may concern:*

Be it known that I, FREDERICK MOMBURG, a citizen of the United States, residing at Ybor City, in the county of Hillsboro and State of Florida, have invented certain new and useful Improvements in Plant-Protecting Sheds, of which the following is a specification, reference being had to the accompanying drawings.

This invention relates to certain new and useful improvements in plant protecting sheds and has for its object to provide a structure adapted to be erected over a garden or plot of ground whereby the plants will be afforded protection against the depredations of animals and which will permit of the regulation of the sun light to the interior of the structure whereby the growth of the plants is fostered.

Another object is to provide a structure having a metallic mesh covering and a plurality of pivoted top sections which are adapted to be locked in open or closed position at different seasons of the year in accordance with the laws governing the cultivation of certain horticultural products.

A further object is to provide a plant protecting structure of the above character which is fire proof, simple and inexpensive to manufacture and one which can be quickly set up in position over the plants.

With these and other objects in view, the invention consists of the novel features of construction and the combination and arrangement of parts hereinafter fully described and claimed, and illustrated in the accompanying drawings, in which—

Figure 1 is a perspective view of one end of a structure constructed in accordance with the present invention; Fig. 2 is a transverse section; Fig. 3 is a longitudinal section, showing one of the pivoted top sections in open position; and Fig. 4 is an under side detail perspective view showing the means for locking the top in closed position.

Referring more particularly to the drawings 5 indicates the sides of the shed protecting structure, and 6 one of the ends thereof. These sides and ends of the shed consist of a wire mesh or covering 7 between the longitudinal strands of which spaced parallel sheet metal plates or straps 8 are interwoven, the ends of said metal straps being bent over and clenched upon the top and bottom longitudinal wires of the covering. The frame of the structure comprises the vertical corner posts 9, the longitudinal side bars 10 and the transverse upper and lower end bars 11. The ends of the side and end bars are suitably secured to the corner posts, and the metallic covering 5 is secured to the parallel bars of this frame by means of staples or in any other convenient manner. A plurality of vertical posts 12 are also arranged within the interior of the structure and to the upper ends of these posts and the corner posts, the ends of the transverse beams 13 are secured. To these beams the bearings 14 are secured and extend above the top of the structure. The top of the shed is adapted to be closed by means of a plurality of pivotally mounted sections 15. Each of these sections comprises a frame consisting of a plurality of longitudinal and transverse bars secured together, and a longitudinal beam 16 secured to the outer face of the frame and provided upon its ends with the projecting trunnions 17. These trunnions are adapted to be mounted in the bearings 14.

In order to secure the top sections in closed position, I provide suitable locking means which comprises the plates 18 secured to the transverse beams 10 and 11 of the structure, said plates being formed with the spaced laterally projecting ears 19. The opposite ends of these plates are slotted to receive the securing screws 20 by means of which they are rigidly held in position upon the beams to receive the locking disks 21 carried by the opposite ends of the pivoted top sections. The locking disks 21 are mounted upon the under side of the top sections on the pivot studs 22, and they are each formed with the notch or recess 23 which is slightly greater in depth than the width of the lugs 19 on the locking plates 18. These disks are also provided with the handle extensions 24 by means of which they may be readily manipulated. Thus, it will be obvious that when the locking disks are turned to dispose the notches or recesses 23 inwardly out of alinement with the lugs 19, the disks will securely hold the top sections in locked position. When it is desired to open the top of the structure to provide greater ventilation for the plants, the locking disks are turned to aline the notches therein with the spaced lugs, when the top sections will swing downwardly from the bearings 14, and be supported in a vertical position in the manner shown in Fig. 4.

The top frames are also covered with the wire mesh in which parallel metal straps are interwoven in a similar manner to the sides and ends of the structure, whereby the plants will be allowed sufficient ventilation and sun light and prevent the entrance of small animals which feed upon plants contained in the structure.

In the cultivation of ginseng, it is essential to successful results that the plants be protected from the full force of the sun's rays, and it is customary to erect over the garden a structure which is formed of spaced laths to provide a suitable lattice work whereby the protection is afforded. In the fall, however, the top of the structure must be removed to permit of greater ventilation and sun light to the plant bed, and it is then necessary to remove the greater portion of the top of said structure which consumes a great amount of time and labor. Such structures are also very expensive, and it is for the purpose of obviating this laborious procedure that my improved structure is devised. In the spring and summer months, the shed is kept closed, and the plants protected from the depredations of animals whose custom it is to feed upon the same, while at the same time they are afforded the proper amount of sun light and ventilation. In the fall and winter the top sections are unlocked and allowed to assume a vertical position between the transverse beams so that the entire top of the shed is opened and the ventilation essential to the proper growth of the plants thereby accorded without necessitating the piecemeal removal of the top of the structure. It will be noted that the top sections are pivotally mounted upon the transverse beams at one side of their longitudinal center. Thus one side of these sections is of greater weight than the other and upon the release of the locking disks, they will automatically swing downward within the inclosure.

From the foregoing it will be seen that I have provided a plant protecting shed or structure which may be inexpensively produced, is fire proof, and one whereby the proper ventilation may be secured at all times and under any conditions. While I have shown and described what I believe to be the preferable embodiment of the invention, it will be obvious that the same is susceptible of various minor modifications without materially departing from the spirit or sacrificing any of the advantages thereof.

Having thus described the invention what is claimed is:

1. A structure of the character described comprising a rectangular frame, a plurality of pivotally mounted top sections arranged in said frame, said sections each having a longitudinally extending beam secured thereon at one side of the transverse center of the section, bearings secured on the frame, the ends of said beams having trunnions positioned in said bearings, a locking disk rotatably secured to said top section at opposite sides, and means carried by the frame to receive said disk and support the top section in its closed position.

2. A structure of the character described comprising a frame, transverse beams secured between the sides of said structure at the top thereof, a plurality of reticulated top sections pivotally mounted upon said beams at one side of their transverse centers, a plate secured to each of said beams formed with spaced inwardly extending lateral lugs, and a pivoted locking disk secured to the under side of the opposite ends of said top sections adapted to be movably disposed between said lugs to lock said top sections in closed position.

3. A structure of the character described comprising a frame, a plurality of transverse beams secured between the opposite sides of the top of the structure, plates secured to the sides of said beams formed with inwardly extending spaced lugs, a locking disk pivotally mounted upon the under side of said top section at each end provided with an inwardly extending recess and a laterally projecting handle portion, said recess being adapted to be moved into alinement with the lugs on said plate whereby the top may be swung downwardly between the transverse beams and assume a vertical open position within the structure.

In testimony whereof I hereunto affix my signature in the presence of two witnesses.

FREDERICK MOMBURG.

Witnesses:
J. C. MOONEY,
J. ALLET RANKIN.